United States Patent
Curtis et al.

(10) Patent No.: US 10,391,562 B2
(45) Date of Patent: Aug. 27, 2019

(54) MACHINE SPINDLE WITH EJECTING MEANS

(71) Applicant: THE GLEASON WORKS, Rochester, NY (US)

(72) Inventors: William A. Curtis, Stanley, NY (US); Kenneth E. Glasow, Spencerport, NY (US); Michael G. Regna, Rochester, NY (US); Craig R. Ronald, Fairport, NY (US)

(73) Assignee: THE GLEASON WORKS, Rochester, NY (US)

( * ) Notice: Subject to any disclaimer, the term of this patent is extended or adjusted under 35 U.S.C. 154(b) by 0 days.

(21) Appl. No.: 15/504,432

(22) PCT Filed: Sep. 4, 2015

(86) PCT No.: PCT/US2015/048637
§ 371 (c)(1),
(2) Date: Feb. 16, 2017

(87) PCT Pub. No.: WO2016/037104
PCT Pub. Date: Mar. 10, 2016

(65) Prior Publication Data
US 2017/0232525 A1   Aug. 17, 2017

Related U.S. Application Data

(60) Provisional application No. 62/046,693, filed on Sep. 5, 2014.

(51) Int. Cl.
*B23B 31/00* (2006.01)
*B23Q 7/00* (2006.01)
(Continued)

(52) U.S. Cl.
CPC ............ *B23B 31/003* (2013.01); *B23B 31/06* (2013.01); *B23F 23/06* (2013.01); *B23Q 7/006* (2013.01);
(Continued)

(58) Field of Classification Search
CPC ... B23B 31/003; B23B 2270/09; B23B 31/06; B23B 31/265; B23Q 7/006; B23F 23/06; Y10S 279/901; Y10T 409/309464
See application file for complete search history.

(56) References Cited

U.S. PATENT DOCUMENTS 3,420,537 A    1/1969  Walters
3,504,583 A *  4/1970  Harman .................. B23Q 3/12
                                                        279/901

(Continued)

FOREIGN PATENT DOCUMENTS

DE         1295325 B        5/1969
DE    102006055422 A1 *    3/2008  ........... B23B 29/046

OTHER PUBLICATIONS

International Search Report and Written Opinion for PCT/US2015/048637, ISA/EPO, dated Nov. 25, 2015, 10 pgs.

*Primary Examiner* — Eric A Gates
(74) *Attorney, Agent, or Firm* — Robert L. McDowell

(57) ABSTRACT

A workholding apparatus (10) wherein a draw bar (22) effects chucking and de-chucking of a workpiece (W) and wherein un-seating of the workholding apparatus is effected by piston-like mechanisms (30) located in a machine spindle (2).

13 Claims, 1 Drawing Sheet

(51) Int. Cl.
 *B23B 31/06* (2006.01)
 *B23F 23/06* (2006.01)
 *B23B 31/26* (2006.01)

(52) U.S. Cl.
 CPC ......... *B23B 31/265* (2013.01); *B23B 2270/09* (2013.01); *Y10S 279/901* (2013.01); *Y10T 409/309464* (2015.01)

(56) References Cited

U.S. PATENT DOCUMENTS

| | | | | |
|---|---|---|---|---|
| 3,670,315 A | * | 6/1972 | Fowler | G11B 17/0282 |
| | | | | 279/2.12 |
| 4,122,755 A | * | 10/1978 | Johnson | B23B 31/003 |
| | | | | 408/238 |
| 4,620,824 A | | 11/1986 | Eckstein et al. | |
| 4,632,613 A | * | 12/1986 | Wollermann | B23B 31/261 |
| | | | | 279/155 |
| 5,087,059 A | * | 2/1992 | Terwilliger | B25B 27/062 |
| | | | | 279/139 |
| 6,260,855 B1 | * | 7/2001 | Curtis | B23B 31/202 |
| | | | | 279/110 |
| 2012/0161404 A1 | * | 6/2012 | Ronald | B23B 31/113 |
| | | | | 279/9.1 |

\* cited by examiner

MACHINE SPINDLE WITH EJECTING MEANS

This application claims the benefit of U.S. Provisional Patent Application No. 62/046,693 filed Sep. 5, 2014, the entire disclosure of which is hereby incorporated by reference.

FIELD OF THE INVENTION

The present invention is directed workholding equipment. Specifically, the present invention discloses a workholding apparatus for securing a workpiece in a machine tool in which the workholding apparatus is quickly secured in, and released from, the spindle of the machine tool.

BACKGROUND OF THE INVENTION

In metalworking operations where a workpiece is machined, equipment of some type is necessary to hold the workpiece in position in a machine tool so the machining process can be successfully carried out. This type of equipment is known as "workholding" equipment. In the production of toothed articles, such as gears, workholding equipment can be generally categorized as two types, chucks and arbors.

Chucks hold a workpiece by contracting a component called a "collet" around the workpiece or a component thereof. For example, when a bevel or hypoid pinion with integral shaft is placed in a chuck, it is usually the shaft that is gripped by the collet which has been reduced in diameter (i.e. contracted) to grip the shaft to hold the pinion in position for machining. Examples of chucks for gripping pinion shanks can be found in U.S. Pat. No. 3,083,976 to Stark and U.S. Pat. No. 3,244,427 to Taschl.

Arbors grip a workpiece by expanding a collet into contact with a surface of the workpiece. As an example, a bevel ring gear is placed on an arbor and the collet is expanded until contact of sufficient force is established with the surface of the bore of the ring gear to hold the ring gear in position during machining. An example of an arbor for a ring gear can be found in U.S. Pat. No. 3,735,994 to Jaehn. An arbor for expanding into contact with the bore of a pinion can be found in U.S. Pat. No. 3,517,939 to Jaehn.

In either chucks or arbors, the force necessary to contract or expand the collet mechanism is provided by a draw bar (or draw rod) in the machine tool. The draw bar is advanced and/or retracted usually via a hydraulically operated piston. Movement of the draw bar in the axial direction of the chuck or arbor usually causes opposed angled surfaces of components within the workholding equipment to slide relative to one another resulting in inward (contracting) or outward (expanding) movement of the collet to grip a workpiece or component part thereof. Generally, one angled surface is found on the collet and the other angled surface is found on an actuator attached to the draw bar or on the draw bar itself.

Chucks and arbors are mounted for rotation in the bore of a spindle of a machine tool. The spindle bore is usually tapered and a similar taper is usually found on the outer surface of the chuck or arbor. Once placed in the spindle bore, a plurality of bolts are extended through holes in a mounting flange, located about the spindle, and into engagement with corresponding threaded holes in the face of the machine spindle.

Securing a chuck or arbor to a machine tool spindle, or ejecting it from the machine tool spindle, are manually performed operations that are very time consuming since the many bolts must be tightened to specifications. When removing the chuck or arbor, aside from the time necessary to loosen and remove all of the bolts, ejector screws usually must be utilized to "break" (i.e. un-seat) the contact between the chuck/arbor outer tapered surface and the tapered inner surface of the spindle bore.

U.S. Pat. No. 6,260,855 to Curtis teaches a workholding apparatus in which action of a draw bar effects gripping and release of a workpiece but also effects the seating of a chuck or arbor being positioned in a machine spindle as well as the un-seating of a chuck or arbor from its seated position in a machine spindle. The apparatus includes sets of spaced apart lugs that must pass by similarly spaced lugs on a draw bar and sleeve when inserting the apparatus in a spindle. Once inserted, the apparatus is turned to align the lugs thereby establishing contact between the apparatus and the draw bar. A stop mechanism is also included on the draw bar to prevent inadvertent forward movement of the draw bar when de-chucking a workpiece.

It is an object of the present invention to provide a means to simplify the installation of a chuck or arbor in a machine spindle and its removal from the spindle while eliminating some components of the chuck or arbor thereby saving time and reducing material and assembly costs.

SUMMARY OF THE INVENTION

The invention is directed to a workholding apparatus wherein a draw bar effects chucking and de-chucking of a workpiece and wherein un-seating of the workholding apparatus is effected by piston-like mechanisms located in a machine spindle.

DETAILED DESCRIPTION OF THE PREFERRED EMBODIMENT

Figure 1:
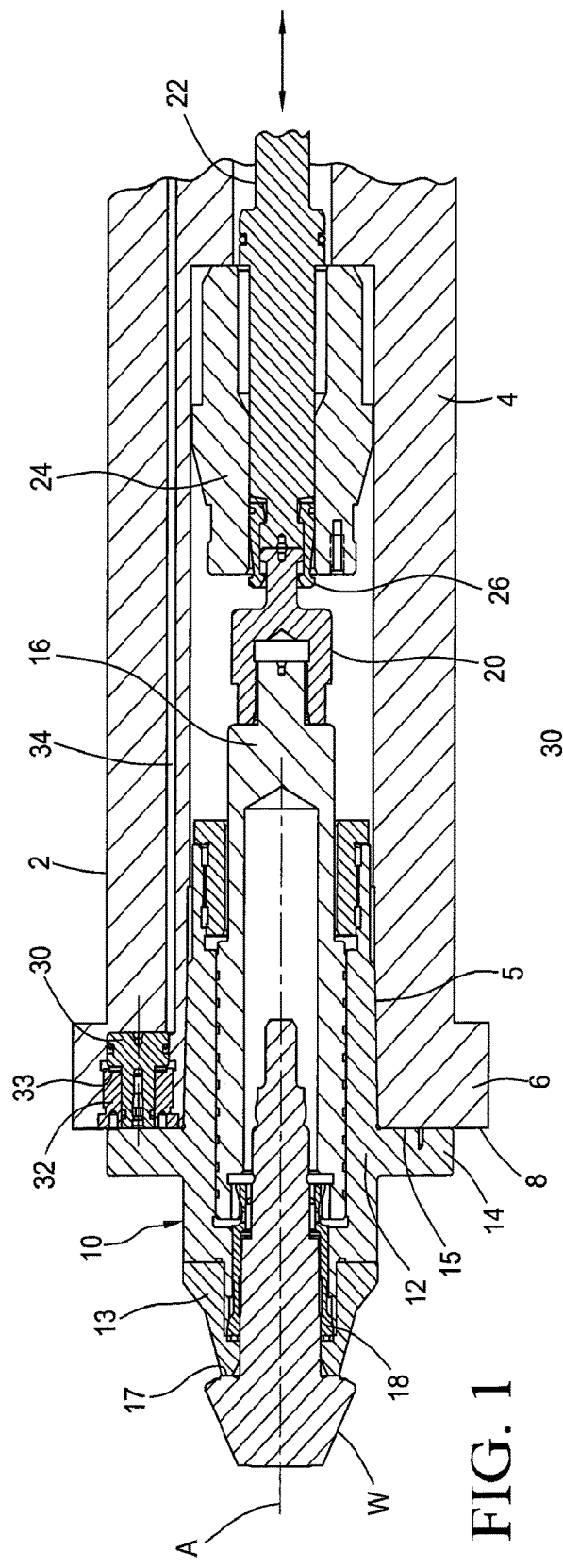
FIG. 1 is an axial cross-section of a machine spindle and chuck mechanism.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers. Although references may be made below to directions such as upper, lower, upward, downward, rearward, bottom, top, front, rear, etc., in describing the drawings, there references are made relative to the drawings (as normally viewed) for convenience. These directions are not intended to be taken literally or limit the present invention in any form.

The use of "including", "having" and "comprising" and variations thereof herein is meant to encompass the items listed thereafter and equivalents thereof as well as additional items.

FIG. 1 shows a spindle 2 for a machine tool (not shown), for example, a machine for grinding or cutting bevel gears such as that disclosed in U.S. Pat. No. 6,712,566 to Stadtfeld et al. Spindle 2 is rotatable about an axis A and includes a spindle body 4 having an inner end (not shown) and an outer end defining an outer opening 9, a tapered inside seating surface 5, flange portion 6 and an outer end surface 8 (i.e. a front surface 8 known as a spindle face) surrounding the outer opening 9 located about axis A at the outer end of spindle 2.

A chuck 10 is seated in spindle 2. Chuck 10 includes a chuck body 12 having a tapered outside surface which is complementary to the tapered inside seating surface 5 of spindle 2. Chuck 10 further includes a flange portion 14, contractor 16, collet 18 and draw bar connector 20. A spindle nose 13 having an end surface 17 is attached to chuck body 12 such as by screws (not shown). FIG. 1 further shows a machine draw bar 22, support member 24 and draw bar collet 26.

Figure 2:
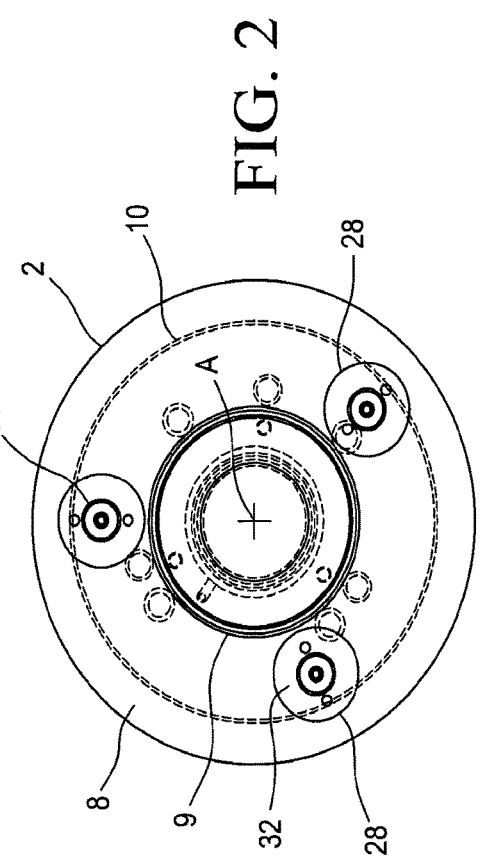
FIG. 2 is a front view of the spindle of FIG. 1.

For ejecting chuck 10 from its seated position in spindle 2, a plurality of ejecting mechanisms 28 (preferably three) are each located in the outer end of the spindle and are spaced, preferably equidistantly, about spindle face 8. It is also preferred that each ejecting mechanism 28 be spaced radially from axis A by the same distance. See FIG. 2. Preferably, each ejecting mechanism 28 comprises an extendable-retractable rod-shaped ejecting element such as a piston 30, for example, with each piston 30 being located within a piston retainer 32. Preferably, a forward ejecting (extending) movement of each piston 30 (to the left in FIG. 1), whereby each piston 30 is extended axially outward from spindle face 8, is effected by fluid pressure supplied via a fluid port 34 extending through the spindle body 4 to each piston 30. The particular fluid is preferably hydraulic oil, but other fluids, such as air, are also contemplated. If ejecting force in addition to the supplied fluid is desired, the force of each piston may be supplemented with springs.

A return (i.e. retracting) movement of each piston (to the right in FIG. 1), whereby each piston 30 retracts axially into spindle face 8, is preferably effected by one or more springs, such as a wave spring 33, once the pressure applied via fluid port 34 is reduced or removed. Alternatively, the return movement of each piston may be accomplished via fluid pressure.

In operation, chuck 10 is inserted into spindle 2 via the outer opening of the outer end of spindle 2. With work piece W mounted in the chuck 10, draw bar 22 is activated (moved to the right in FIG. 1) at a high pressure (e.g. 12,000 pounds-force (53,379 Newtons)) to engage both the draw bar collet 26 and chuck collet 18 to seat the chuck 10 and the work piece W respectively. Both chuck 10 and work piece W are now secured to the spindle 2 for rotation about axis A. The back face 15 of chuck flange portion 14 is located against spindle face 8. The work piece can now be processed (e.g. grinding).

To remove the work piece W from chuck 10, draw bar 22 is activated in opposite direction (moved to the left in FIG. 1) at low pressure (e.g. 6,000 pounds-force (26,689 Newtons)). The force exerted by the draw bar 22 is sufficient to disengage the chuck collet 18 thereby releasing work piece W while being sufficiently low so as to not affect the seating of chuck 10 in spindle 2. The work piece W can now be removed. Another work piece is mounted into chuck 10 and clamped by activating draw bar 22 in the opposite direction (to the right in FIG. 1) at the low force. The process is repeated for each successive work piece until such time as chuck 10 is to be removed.

The chuck 10 is released from its seated position in spindle 2 by actuating the three pistons 30 that are embedded in spindle face 8 to project each piston 30 axially outward from spindle face 8. Pistons 30 exert a total force (e.g. 9,000 pounds-force (40,034 Newtons)) onto chuck flange 14 preferably in the axial direction (A). Thus, based on the example, with three pistons, each piston provides 3,000 pounds-force (13,345 Newtons). The total force must be sufficient to unseat the tapered surfaces engagement between outside tapered surface of chuck 10 and inside tapered surface 5 of spindle 2. Once the seating contact is "broken", the chuck 10 can be easily removed from machine spindle 2.

While the invention has been described with reference to chucks, the invention is equally applicable to arbors. While a bevel pinion has been illustrated, a ring gear is likewise contemplated. While pistons are the preferred mechanisms for ejecting a workholding mechanism from a seated position in a spindle, any other controllable mechanism which can be located in the spindle and be activated to exert an effective ejecting force is contemplated by the invention. If desired, ejecting mechanisms 28 may be located in back face 15 of workholding flange portion 14 instead of in the spindle face 8.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A machine spindle rotatable about an axis of rotation, said spindle comprising a spindle body having an outer end with said outer end having an opening and an end surface surrounding said opening, thereby providing, within said spindle body, for a seated position for a workholding apparatus in the form of a chuck or an arbor, said spindle further comprising:
   a plurality of rod-shaped ejecting elements located in said outer end at said end surface with each of said rod-shaped ejecting elements being extendable from said end surface and retractable into said end surface,
   said rod-shaped ejecting elements being operable to extend from said end surface and into contact with a surface of a workholding apparatus located in said seated position, said contact being of a force sufficient to urge said workholding apparatus from said seated position.

2. The machine spindle of claim 1 wherein said rod-shaped ejecting element comprises a piston.

3. The machine spindle of claim 2 wherein said piston is located within a piston retainer.

4. The machine spindle of claim 1 wherein said rod-shaped ejecting elements are extendable via fluid pressure.

5. The machine spindle of claim 4 further comprising said rod-shaped ejecting elements being extendable via springs.

6. The machine spindle of claim 1 further comprising said rod-shaped ejecting elements being retractable via springs.

7. The machine spindle of claim 1 wherein said plurality of rod-shaped ejecting elements are spaced equidistantly about said end surface.

8. The machine spindle of claim 1 wherein said plurality of rod-shaped ejecting elements are spaced radially equidistantly from said axis of rotation.

9. A method of breaking the seating contact between a machine spindle and a workholding apparatus in the form of a chuck or an arbor seated within said spindle, said method comprising:

providing a machine spindle rotatable about an axis of rotation, said spindle comprising a spindle body having an outer end with said outer end having an opening and an end surface surrounding said opening, said spindle further comprising a plurality of rod-shaped ejecting elements located in said outer end at said end surface with each of said rod-shaped ejecting elements being extendable from said end surface and retractable into said end surface, extending said rod-shaped ejecting elements from said end surface, bringing said rod-shaped ejecting elements into contact with a surface of the seated workholding apparatus, said contacting being of a force sufficient to urge said workholding apparatus from the seated contact.

10. The method of claim 9 wherein said rod-shaped ejecting elements comprise pistons.

11. The method of claim 9 wherein said extending of said rod-shaped ejecting elements is effected by fluid pressure.

12. The method of claim 9 further comprising retracting said rod-shaped ejecting elements.

13. The method of claim 9 wherein said retracting is effected by springs.

\* \* \* \* \*